Patented Aug. 4, 1936

2,050,018

UNITED STATES PATENT OFFICE 2,050,018

METHOD OF PREPARING PHENYL-MERCURY ACETATE

Mahlon J. Rentschler, Willoughby, Ohio, assignor to The Hamilton Laboratories, Inc., Hamilton, Ohio, a corporation of Delaware No Drawing. Application March 22, 1933, Serial No. 662,184. Renewed July 12, 1934

8 Claims. (Cl. 260—13)

This invention relates to an improved process for preparing pure phenyl-mercury acetate from reaction mixtures containing the same and has for its principal objects to provide a method which is simpler and less expensive and results in an increased yield of a superior product.

I am aware that prior to my invention phenyl-mercury acetate has been prepared by the interaction of mercuric acetate and benzene in the presence of acetic acid as well as in other ways and accordingly I do not claim broadly the preparation of this compound but I do claim the improved method of preparation attaining the above objects as will now be set forth by reference to a specific example and will be particularly pointed out in the claims.

Mercuric oxide or mercuric acetate may be placed in an autoclave with an excess of thiophene-free benzene and glacial acetic acid. This mixture may be autoclaved at a pressure of about six pounds per square inch and at a temperature of about 100° C. for a sufficient time to complete the reaction, about three or four hours. This results in a reaction mixture containing in solution not only the desired phenyl mercury acetate but also mercurated bodies which can be regarded as impurities; among them, poly-mercury benzene compounds. When the reaction is complete the pressure may be relieved and the benzene distilled off. This distillation should be carried on long enough to remove all traces of benzene. This may be readily accomplished by maintaining the temperature at about 100° C., since benzene boils at about 80° C. and acetic acid boils at 118° C. It is important that all the benzene should be removed since it is a solvent for the poly-mercury benzene compounds which are formed as well as phenyl-mercury acetate in the reaction. When the benzene has been entirely removed it will be found that the phenyl-mercury acetate will remain in solution in the acetic acid while the impurities (poly-mercury benzene compounds) will be precipitated.

The resulting mixture may then be cooled and filtered whereby a solution of phenyl-mercury-acetate in acetic acid will remain. Prior practice indicates that the acetic acid should be removed by evaporation of the liquid to dryness but I have found that such procedure results in a poor yield and, what is more important, a deterioration of the product. Instead of following this procedure I mix the acetic acid solution with a large quantity of cold water, at least twice the volume of the solution and preferably several times the volume thereof. Inasmuch as phenyl-mercury acetate is insoluble in cold water and in dilute acetic acid it is precipitated almost quantitatively. While a certain portion of the product may be precipitated by the addition of a less quantity of cold water, a reduction below two volumes of cold water to each volume of solution will result in a decrease in yield of material of equal purity. The dilute acetic acid may now be decanted and the precipitate washed with cold water until the mass becomes neutral and the last trace of acetic acid is removed. The phenyl-mercury acetate may now be dissolved in boiling water, filtered and allowed to crystallize. In this way a finished product is secured which has a constant and sharp melting point of 148° C.

While I have described the process as involving a reaction between mercuric oxide, benzene and acetic acid, it is to be understood that other reactants may be employed such as mercuric acetate and benzene or the like so long as the reaction mixture contains phenyl-mercury acetate and poly-mercury benzene compounds in the presence of benzene and acetic acid. It is also within the scope of my invention to separate phenyl-mercury acetate or the like from acetic acid solution, however obtained, by diluting the mixture with a large quantity of cold water to precipitate the phenyl-mercury acetate.

Having thus described my invention, what I claim is:

1. The method of separating phenyl-mercury acetate in a pure state from cold crude reaction mixtures containing the same in solution in acetic acid and also containing mercurated impurities, which comprises diluting the solution with sufficient cold water to precipitate phenyl-mercury acetate and without producing sufficient dilution to separate the impurities and then separating the precipitated phenyl-mercury acetate from the dilute liquid.

2. In the process of claim 1, diluting the crude solution with at least twice its volume of cold water.

3. The method of separating phenyl-mercury acetate from a crude reaction mixture containing the same and poly-mercury benzene compounds in solution in benzene and acetic acid which comprises distilling off the benzene, separating the resulting precipitate from the solution, diluting the resulting solution with enough water to precipitate the phenyl-mercury acetate and separating the latter from the dilute solution.

4. The method of separating phenyl-mercury acetate from a crude reaction mixture containing the same and poly-mercury benzene compounds in solution in benzene and acetic acid which comprises distilling off all the benzene, separating the resulting precipitate from the solution, adding to said solution at least double its volume of cold water and separating the resulting precipitate from the dilute solution.

5. The method of separating phenyl-mercury acetate from a crude reaction mixture containing the same and poly-mercury benzene compounds in solution in benzene and acetic acid which comprises distilling off the benzene, separating the resulting precipitate from the solution, diluting the resulting solution with enough water to precipitate the phenyl-mercury acetate, decanting the dilute solution, washing the precipitate and recrystallizing it from hot water.

6. The method of separating phenyl-mercury acetate from a crude reaction mixture containing the same and poly-mercury benzene compounds in solution in benzene and acetic acid which comprises distilling off all the benzene, separating the resulting precipitate from the solution, adding to said solution several times its volume of cold water and separating the resulting precipitate from the dilute solution.

7. The method of preparing phenyl-mercury acetate which comprises reacting together, at a temperature of the order of 100° C. and under a slight pressure, mercuric oxide and an excess of benzene and glacial acetic acid, relieving the pressure and maintaining the temperature until all the benzene is removed from the reaction mixture, separating the precipitated poly-mercury benzene compounds, diluting the remaining solution with a large volume of cold water and separating the resulting precipitate of phenyl-mercury acetate.

8. The method of separating phenyl-mercury acetate from a solution of the same in acetic acid which comprises diluting the solution with sufficient cold water to precipitate the phenyl-mercury acetate, separating the precipitate from the dilute solution, washing it with cold water and recrystallizing it from hot water.

MAHLON J. RENTSCHLER.